United States Patent [19]

Crepin et al.

[11] Patent Number: 4,766,436
[45] Date of Patent: Aug. 23, 1988

[54] RADAR DEVICE FOR MEASURING THE DISTANCE OF THE DEVICE TO A SURFACE

[75] Inventors: Hugues Crepin, Buc; Serge Hethuin, Meudon, both of France

[73] Assignee: U.S. Philips Corporation, New York, N.Y.

[21] Appl. No.: 65,535

[22] Filed: Jun. 23, 1987

[30] Foreign Application Priority Data

Jun. 27, 1986 [FR] France ................................ 86 09367

[51] Int. Cl.$^4$ ............................................. G01S 13/26
[52] U.S. Cl. ...................................... 342/122; 342/128
[58] Field of Search ........................ 342/122, 128, 145

[56] References Cited

U.S. PATENT DOCUMENTS

| 4,078,234 | 3/1978 | Fishbein et al. | 342/145 X |
| 4,107,679 | 8/1978 | Strauch et al. | 342/87 |
| 4,205,314 | 5/1980 | Strauch | 342/87 |
| 4,568,938 | 2/1986 | Ubriaco | 342/122 X |
| 4,599,618 | 7/1986 | Haendel et al. | 342/122 X |
| 4,620,192 | 10/1986 | Collins | 342/128 |

Primary Examiner—T. H. Tubbesing
Assistant Examiner—Mark Hellner
Attorney, Agent, or Firm—Robert J. Kraus

[57] ABSTRACT

This radar device for measuring the distance h of the device to a surface (2) includes transmission means (5) for transmitting to the surface a frequency-modulated wave E(t) provided by an oscillator (14) having a frequency control, receiving means (7) for receiving this wave R(t) reflected from the surface, a mixer circuit (10) for producing a beat wave between the transmitted and received waves and a processing circuit (20) including a beat-wave-digitizing circuit (25) and a time-frequency transform operator (27) for supplying frequency components from which the distance h is determined. This processing circuit (20) further includes an auto-correlation operator for effecting an auto-correlation of the beat wave digitized by the circuit (25) and also spectrum processing means (32) for finally determining the distance h.

5 Claims, 3 Drawing Sheets

RADAR DEVICE FOR MEASURING THE DISTANCE OF THE DEVICE TO A SURFACE

BACKGROUND OF THE INVENTION

The present invention relates to a radar device for measuring the distance h of the device to a surface, comprising means for transmitting a frequency-modulated wave provided by an oscillator having a frequency control, receiving means for receiving this wave reflected from said surface, a mixing circuit for producing a beat wave between the transmitted and received waves and a processing circuit including a beat wave digitizing circuit and a time-frequency transform means for producing frequency components from which the distance h is determined.

Such a device is used more specifically in the field of radio navigation where it can be used as a radio altimeter. Reference is made to U.S. Pat. No. 4,568,938.

In the radar device disclosed in said patent, a time-frequency transform is effected directly on the beat wave. The frequency components of the lowest frequency where a signal is found provides the distance h. The fact that a time-frequency transform is effected directly on the beat wave leads to a first disadvantage. Actually, the frequency components thus determined are greatly beset with the noise inherent to this type of radar devices and it is thought that the distance h can only be very approximative.

The fact that the lowest frequency component is used to determine the distance h leads to a second disadvantage. This second disadvantage is obvious above all for small distances h and when there is relative motion of the radar device with respect to the surface. In the sequel of this description it will be demonstrated that the spectrum of the beat wave is extended by a function sin x/x where x is a variable depending on h and on the duration of the frequency variation of the oscillator. It follows that the lowest frequency component does not necessarily represent the distance h. In addition, the spectrum of the beat wave can be still further extended by the Doppler effect when there is a relative displacement between the device and the surface.

SUMMARY OF THE INVENTION

An important characteristic of the invention is that the processing circuit includes an auto-correlation operator for effecting an auto-correlation of the beat wave before it is applied to the time-frequency performing means. This avoids said first disadvantage and suppresses the noise effect to a large extent.

Another important characteristic of the invention is that the processing circuit also includes spectrum processing means to determine the frequency from which the distance h is determined. This avoids said second disadvantage and consequently renders it possible to obtain a good approximation of the distance h even when there is a relative displacement between the radar device and the surface.

BRIEF DESCRIPTION OF THE DRAWING

The following description, which is given by way of non-limitative example with reference to the accompanying drawing figures, will make it better understood how the invention can be carried into effect.

DESCRIPTION TO THE PREFERRED EMBODIMENTS

Figure 1:
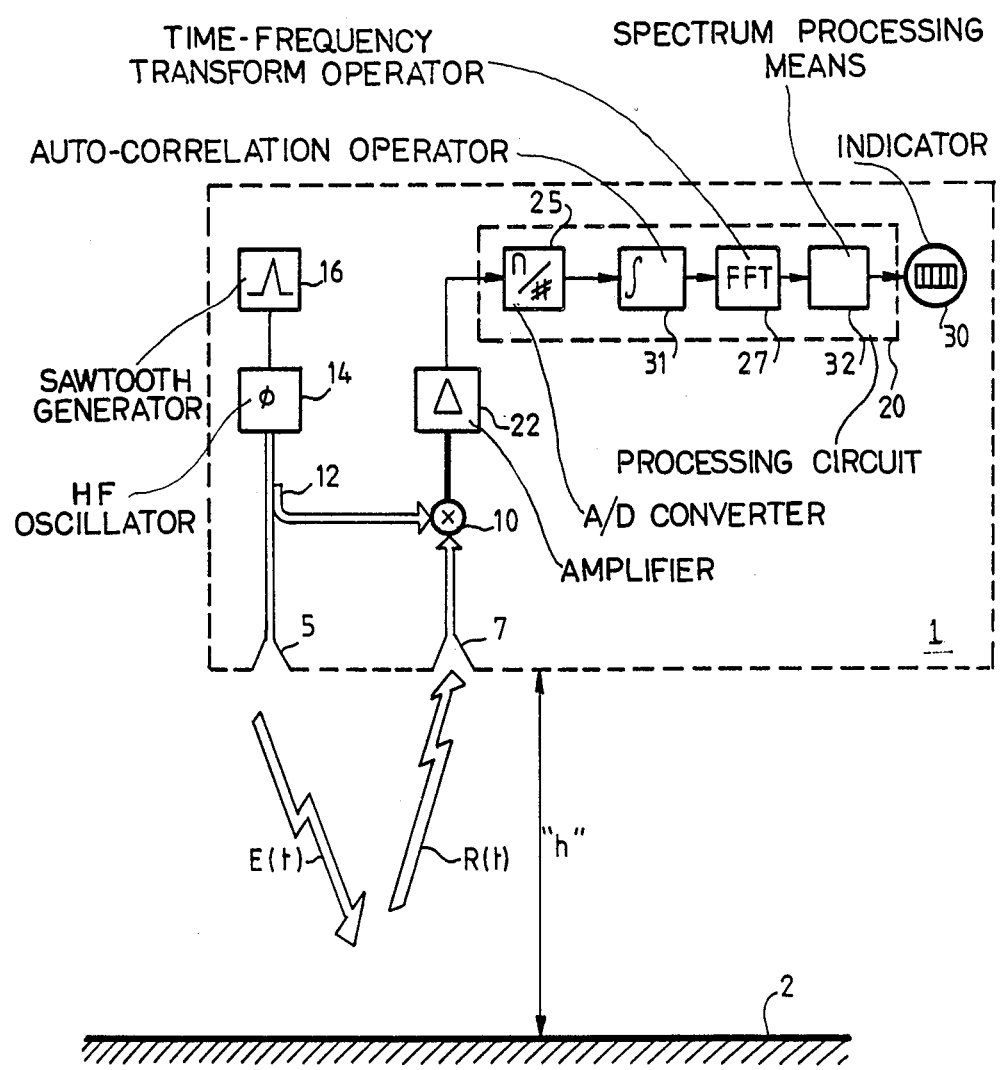
FIG. 1 shows a radar device according to the invention.

In FIG. 1, reference numeral 1 denotes the device according to the invention intended to measure the distance h between the device and a flat surface 2. In the described example the device is used in the field of radio navigation where the device 1 is installed in an aircraft while the flat surface is the earth and consequently the distance "h" is the height.

The device 1 includes a transmitting aerial 5 from which a wave E(t) is transmitted towards the ground and a receiving aerial 7 for receiving the wave R(t) reflected from the soil 2. A mixer circuit 10 effects mixing of the reflected wave with a portion of the transmitted wave picked up by means of a coupler 12 which is connected into the region of the input of the transmitting aerial 5. The transmitted wave is processed by means of a high frequency oscillator 14 which oscillates at a frequency $f_O$ of the order of 4 GHz. Its frequency is controlled by a sawtooth generator 16. Thus, the transmitted wave is frequency modulated in a frequency range ΔF and it is possible to write:

$$E(t) = A \cos \left[ 2\pi \left( f_O + \frac{\Delta F}{T} t \right) t \right] \quad (1)$$

for t varying in the time intervals T in which the sawtooth wave is produced. A is a constant defining the amplitude of the wave. The wave R(t) received after reflection from the soil (2) is written:

$$R(t) = B \cos \left[ 2\pi \left( f_O + \frac{\Delta F}{T} (t - \tau) \right) (t - \tau) \right]$$

where B is a constant defining the received level and τ represents the delay between the transmitted and reflected waves.

The mixer circuit 10 has for its object to cause to appear at its output a signal $$M(t) = C \cos \left[ 2\pi \frac{\Delta F}{T} \tau t \right] \quad (2)$$

where C represents a constant.

The distance h:

$$f_b = \tau \frac{\Delta F}{T} \text{ where } \tau = \frac{2h}{c}$$

(c=velocity of light) is derived from the frequency $f_b$ of the signal M(t) so that:

$$h = \frac{f_b \cdot c}{2\Delta F} T$$

The processing circuit 20 then effects a processing operation on the output signal of the mixer circuit 10 after amplification by an amplifier 22. This processing operation is performed on n digital samples obtained by means of an analog-to-digital converter 25. A time-frequency transform operator 27, for example a Fourier transform operator, is used to determine the frequency $f_b$ so as to enable the distance h to be displayed by an indicator 30.

According to the invention, the processing circuit 22 further includes an auto-correlation operator 31 for effecting an auto-correlation of the beat wave digitized by the analog-to-digital converter 25 before being submitted to the time frequency transform operation effected by the operator 27. In addition, the circuit 20 includes spectrum processing means 32 to determine from the spectrum obtained by said time frequency transformer, the frequency $f_b$ corresponding to the distance h.

The mode of operation of the device according to the invention is based on the following consideration. To simplify the explanations, let it be assumed that the surface 2 behaves as a perfect reflecting surface (specular reflection).

Figure 2:
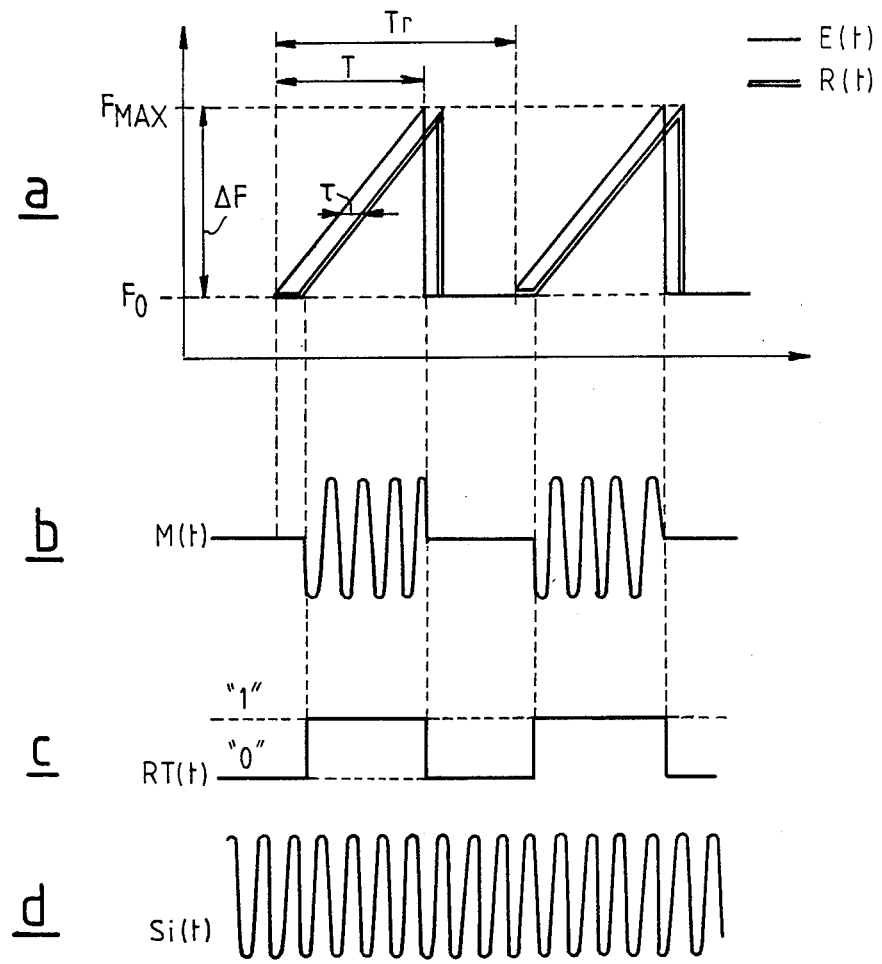
FIG. 2 shows, as a function of time, the shape of some signals of the device of FIG. 1.

In FIG. 2, the shape of the frequency variation of the transmitted wave E(t) is represented at a by a single line and the received wave R(t) by a double line. These frequencies vary linearly during a period of time T and with a periodicity TR. Consequently the beat signal M(t) has the shape shown at b; this signal then shows itself in the form of sine-wave trains. It is divided into a square-wave signal RT(t) shown at c and a sine wave Si(t) shown at d (phase interruptions have been ignored here).

Figure 3:
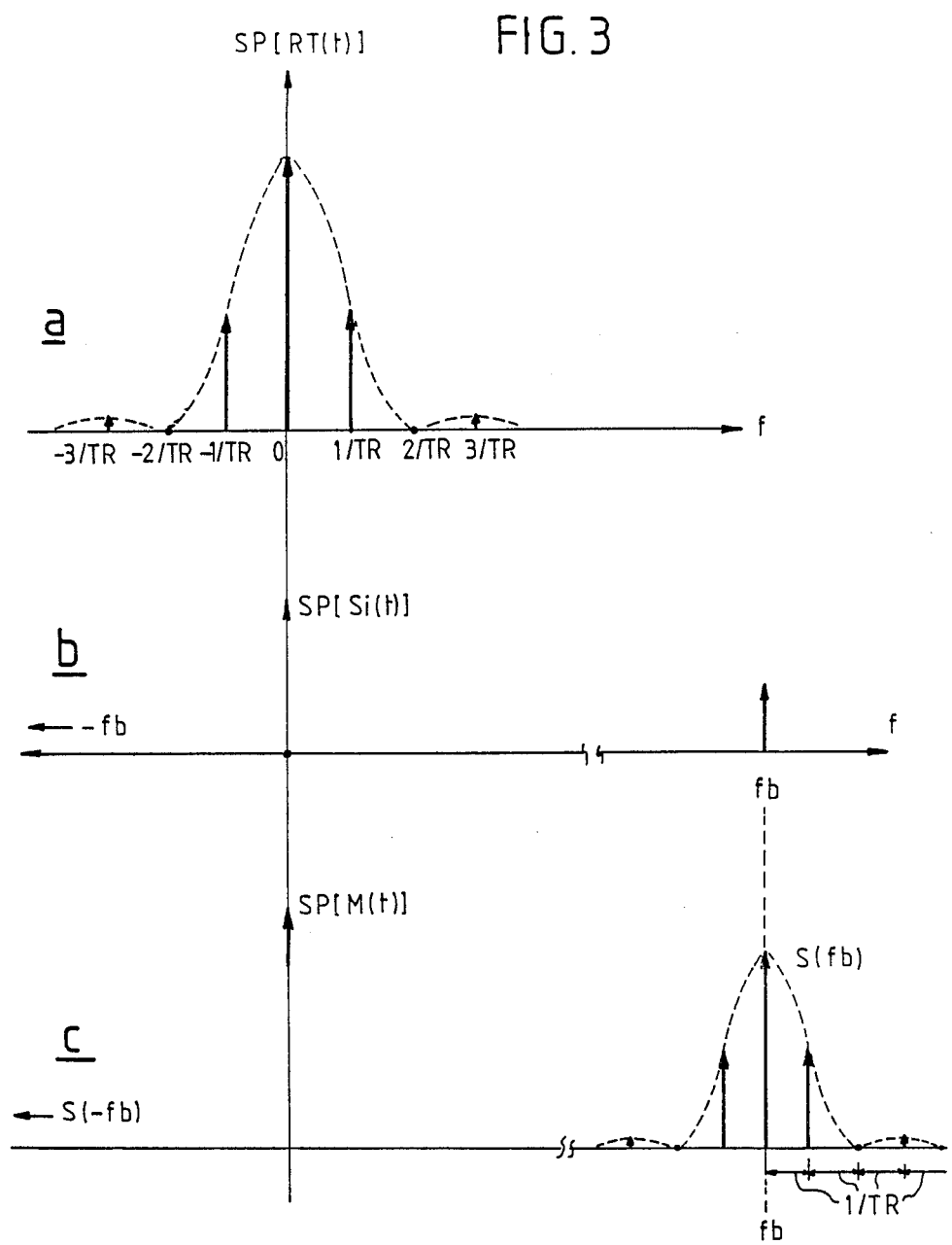
FIG. 3 shows the shape of the spectrum of the signals of FIG. 2.

FIG. 3 shows the shapes of the different spectra relative to these signals.

At a the spectrum SP[RT(t)] of the square-wave signal is shown. This signal being a periodic signal, its spectrum is formed of discrete lines spaced apart by 1/Tr. The amplitudes of these components have the function $[\sin x/x]^2$ as their envelope.

At b there is shown the spectrum SP[Si(t)] of the signal Si(t) which is formed by two components at the frequencies $f_b$ and $-f_b$; only the component at $f_b$ is shown.

Finally, at c there is shown the spectrum of the signal SP[M(t)] of M(t) which is given by the convolution product of the two preceding spectra:

$$SP[M(t)] = SP[Si(t)] * SP[RT(t)]$$

that is to say that this spectrum is the spectrum of the signal RT(t) shifted by the frequency $f_b$.

It will then be obvious that the frequency components of the lowest frequency do not correspond very accurately to the frequency $f_b$.

Although until now the description has been based on the spectrum of the signal at the output of the mixer 10, the description also applies to the auto-correlation function of this same signal. As the spectrum of a signal and the spectrum of its auto-correlation function have lines at the same frequencies, the auto-correlation operation renders it possible for the transform provided by the operator 27 to be effected on a signal having an improved signal-to-noise ratio and consequently a better precision is thus obtained.

The spectrum processing means 32 processes the different lines provided by the operator 27. The means 32 operates only on the components which have a sufficient amplitude above noise. Typically an amplitude better than $3\sigma$ is chosen ($\sigma$ being the mean noise level). In accordance with one embodiment of the invention, the means 32 determines the barycenter of the spectrum. Thus, for a spectrum whose components have for their amplitudes $c_n$ (n=k, k+1, ..., k+m) extending over the frequencies $f_n$, the frequency $f_b$ is determined by:

$$f_b = \frac{\sum_{n=k}^{k+m} c_n \cdot f_n}{\sum_{n=k}^{k+m} c_n}$$

In accordance with a second embodiment the means 32 utilizes the following method:

That value i which gives the maximum absolute value of $c_n - c_{n-1}$, that is to say $c_i - c_{i-1}$ is determined.

Those components $c_i$ or $c_{i-1}$ having the highest amplitude are determined, the frequency $f_b$ then being $$f_b = f_i \text{ or } f_{i-1} \text{ depending on } c_i > c_{i-1} \text{ or } c_{i-1} > c_i.$$

In accordance with a third embodiment the means 27 utilizes the following method:

$f^2_b$ is calculated in accordance with the formula $$f_b^2 = \frac{\sum_{n=k}^{k+m} c_n \cdot f_m^2}{\sum_{n=k}^{k+m} c_n}$$

Thereafter $f_b$ is determined by calculating the square roots of the preceding quantity.

These further embodiments are not incompatible with the fourth embodiment which consists in taking the maximum value of the components $c_n$ for $f_b$.

Then the value n, so the value of i, is determined, which is such that $c_i$ is at its maximum, from which it follows that $f_b = f_i$.

In actual practice the spectrum processing means 32 is advantageously constituted by a microprocessor assembly; it will be easy for a person skilled in the art to program the methods mentioned above to obtain the value $f_b$.

What is claimed is:

1. A radar device for measuring the distance h of the device from a surface, said device comprising:
    a. transmitting means for transmitting a frequency-modulated wave toward the surface;
    b. receiving means for receiving a reflection of the wave from the surface;
    c. a mixer circuit electrically coupled to the transmitting and receiving means for producing a beat signal; and
    d. processing means for determining from the beat signal the distance h, said processing circuit including:
        (1) a digitizing circuit electrically coupled to the mixer circuit for producing digital samples of the beat signal;
        (2) auto-correlation means electrically coupled to the digitizing circuit for effecting auto-correlation of the digital samples of the beat signal;
        (3) time-frequency transform means electrically coupled to the auto-correlation means for producing from the auto-correlated samples components representative of the frequency spectrum of the reflection wave; and
        (4) spectrum processing means electrically coupled to the time-frequency transform means for operating on selected ones of the components having predefined amplitudes and determining a frequency $f_b$ representative of the distance h.

2. A radar device as claimed in claim 1, characterized in that the spectrum processing means determines the frequency $f_b$ by performing the operation:

$$f_b = \frac{\sum\limits_{n=k}^{k+m} c_n \cdot f_n}{\sum\limits_{n=k}^{k+m} c_n}$$

where $c_n$ are the amplitude values of the components produced by the time-frequency transform means and where $f_n$ are the frequency values with respect to these amplitudes, n being an integer varying from k to k+m.

3. A radar device as claimed in claim 1, characterized in that the spectrum processing means operates on amplitude values $c_n$ of the components produced by the time-frequency transform means for the frequencies $f_i$, in accordance with the following method:

a. that value i is determined which gives the maximum absolute value of $c_n - c_{n-1}$, that is to say $c_i - c_{i-1}$;

b. those components $c_i$ or $c_{i-1}$ are determined which have the highest amplitude;

c. determining the frequency in accordance with the formula:

$f_b = f_i$ or $f_{i-1}$ depending on whether $c_i > c_{i-1}$ or $c_{i-1} > c_i$, respectively, n being an integer varying from k to k+m.

4. A radar device as claimed in claim 1, characterized in that the spectrum processing means operates on amplitude values $c_n$ of the components produced by the time-frequency transform means for the frequencies $f_n$ in accordance with the following method:

a. $f^2_b$ is calculated in accordance with the formula $$f_b^2 = \frac{\sum\limits_{n=k}^{k+m} c_n \cdot f_m^2}{\sum\limits_{n=k}^{k+m} c_n}$$

b. the value h is determined by finding the square-root value $f_b$ of the preceding quantity, n being an integer varying from k to k+m.

5. A radar device as claimed in claim 1, characterized in that the spectrum processing means operates on amplitude values $c_n$ of the components produced by the time-frequency transform means for the frequencies $f_i$ to determine the value i such that $c_i$ is the highest of the components and the frequency $f_b$ from which h is determined then being $f_b = f_i$, n being an integer varying from k to k+m.

* * * * *